United States Patent
Annesley et al.

(10) Patent No.: US 6,919,017 B2
(45) Date of Patent: Jul. 19, 2005

(54) SEPARATION PROCESS AND APPARATUS FOR REMOVAL OF PARTICULATE MATERIAL FROM FLASH ZONE GAS OIL

(75) Inventors: Sharon A. Annesley, Ponca City, OK (US); Gary C. Hughes, Ponca City, OK (US); Jamal Allyen Sandarusi, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 395 days.

(21) Appl. No.: 10/121,897

(22) Filed: Apr. 11, 2002

(65) Prior Publication Data

US 2003/0192810 A1 Oct. 16, 2003

(51) Int. Cl.[7] ............................. C10B 55/04; C10G 9/14
(52) U.S. Cl. .................... 208/50; 208/131; 208/132; 208/95
(58) Field of Search ............................. 208/50, 131, 132, 208/95

(56) References Cited

U.S. PATENT DOCUMENTS

| | | | |
|---|---|---|---|
| 4,208,270 A | | 6/1980 | Grieve et al. |
| 4,354,920 A | * | 10/1982 | Rosenthal et al. .......... 208/408 |
| 4,859,284 A | * | 8/1989 | Rammler et al. ............. 201/12 |
| 4,882,036 A | | 11/1989 | Eidt, Jr. et al. |
| 5,059,301 A | | 10/1991 | Roussel et al. |
| 5,645,711 A | | 7/1997 | Hraban et al. |
| 5,645,712 A | | 7/1997 | Roth |
| 5,824,194 A | | 10/1998 | Kruse |
| 5,855,742 A | | 1/1999 | Lumbroso et al. |
| 5,954,949 A | * | 9/1999 | Ohsol et al. ................ 208/131 |
| 6,129,217 A | | 10/2000 | Trickey et al. |

FOREIGN PATENT DOCUMENTS

EP    0 156 614 A    2/1985

OTHER PUBLICATIONS

Krebs Engineers, "Krebs gMAX™Cyclone," www.krebs.com/p_gmax.htm, printed Mar. 20, 2002.
Kelton, G.P., Torres, D.L., Rawlins, H., "Use hydrocyclones to improve delayed coker operations," Hydrocarbon Processing, Mar. 1998, pp. 111–16.
Chemicals Technology, "Streamlines through a hydrocyclone simulated with the CFX–5 Reynolds stress turbulence model," www.chemicals–technology.com/contractors/processsimulation/aea4.html and www.chemicals–technology.com/contractors/processsimulation/aea/index, printed Jul. 3, 2002.
Natural Resources Canada, "ASI–Hydrocyclone Technology," www.nrcan.gc.ca/es/etb/cwrc/english/ast/researchareas/hydrocyclones/hydrocyc.htm, printed Jul. 3, 2002.
Krebs Engineers, "Krebs gMAX™ Cyclones—Fro Finer Separations With Larger Diameter Cyclones," Aug. 2000, www.krebs.com/p_gmax.htm, printed Jul. 3, 2002.

(Continued)

Primary Examiner—Glenn Caldarola
Assistant Examiner—Tam M. Nguyen (57) ABSTRACT

A process and an apparatus for removing particulate material from a flash zone gas oil stream produced in a delayed coking unit. The process and apparatus of the invention employ cyclonic separation to remove particulate material from the flash zone gas oil stream. The stream can then be further processed, for example by passing the stream to a fixed bed catalytic hydroprocessing unit and then to a fluidized bed catalytic cracking unit, or to other processing units, thereby enhancing the value of the flash zone gas oil stream.

33 Claims, 8 Drawing Sheets

OTHER PUBLICATIONS

Schlumberger Oilfield Glossary, "Search on hydrocyclone," www.glossary.oilfield.slb.com/Search.clm?word=hydrocyclone.html, printed Jul. 3, 2002.

Process Simulation, Ltd., "Hydrocyclones," www.psl.bc.ca/equipment/hydrocyclone/, printed Jul. 3, 2002.

Flo Trend Systems Inc., "Hydrocyclone," www.flotrend.com/hydrocyclone.html, printed Jul. 3, 2002.

Kirk–Othmer: "Encyclopedia of chemical technology," 1996, John Wiley & Sons, New York XP002245352, vol. 21, p. 901–p. 923.

* cited by examiner

SEPARATION PROCESS AND APPARATUS FOR REMOVAL OF PARTICULATE MATERIAL FROM FLASH ZONE GAS OIL

TECHNICAL FIELD

The present invention relates to delayed coking processes, and more particularly to a process and an apparatus for removal of particulate material from a flash zone gas oil stream in a delayed coking unit.

BACKGROUND

In a delayed coking process, overhead vapors from a coke drum are passed to a coke fractionator wherein the coker overheads are separated into a vapor stream, one or more intermediate liquid streams, and a flash zone gas oil (FZGO) stream. The FZGO stream often contains significant amounts of finely divided particulate solids (e.g. coke fines) of varying diameter, as well as heavy viscous mesophase material. The mesophase material can be liquid coke that is entrained in the vapors leaving a coke drum and is often coated on coke particles, making the particles sticky. In order to enhance the value of an FZGO stream, further processing is necessary, and it is desirable to pass the FZGO stream to, for example, a fixed bed catalytic hydroprocessing unit and then to a fluidized bed catalytic cracking (FCC) unit or to other processing units. Undesirably, however, entrained solids and mesophase material in the FZGO stream can quickly plug and foul the catalyst bed of the hydroprocessor.

Unhydrotreated flash zone gas oil can be processed in a fluidized bed catalytic cracking unit (FCC unit), but the yield distribution of the unhydrotreated FZGO stream is generally poor due to its highly aromatic content and other factors.

A filter medium can be used to filter out particles from the FZGO stream. However, filtration processes are susceptible to filter plugging, can require significant periods of shutdown to clean or remove tar or gum build up to regenerate the filter medium, and can require significant initial capital expenditure to install.

It would be advantageous, therefore, to provide a process and an apparatus that operate efficiently and economically to remove particulate material from the FZGO stream, thereby facilitating subsequent processing of the FZGO stream and providing an opportunity for improving refinery economics by enhancing the value of the FZGO stream.

SUMMARY

The present invention provides a process and an apparatus for removing particulate material from a flash zone gas oil stream, including particulates that are about 15 micrometers to 25 micrometers or more in diameter. According to the invention, cyclonic separation technology is used to centrifugally remove particulate material from the FZGO stream to form a reduced particulate stream. The reduced particulate stream can then be further processed, for example, in a hydroprocessing unit and subsequent fluidized bed catalytic cracking (FCC) unit, to provide valuable products. Removing the particulate material from the FZGO stream before it enters a hydroprocessing unit allows the stream to be processed without, or with reduced incidence of, plugging of the hydroprocessing unit catalyst bed.

In an aspect of the invention, an improved delayed coking process is provided, wherein overhead vapors from a coking drum are fed to a coker fractionator where the vapors are separated into an overhead vapor stream, intermediate liquid streams, and a flash zone gas oil stream containing a substantial amount of particulate material of varying diameter, the improved process further comprising the steps of supplying the flash zone gas oil stream to a first separator;

operating the first separator to remove particulate material having a diameter greater than about 500 micrometers from the flash zone gas oil stream and form a first reduced particulate stream;

supplying that reduced particulate stream to a second separator comprising a cyclonic separator;

operating the second separator to remove particulate material having a diameter greater than about 25 micrometers from the reduced particulate stream and form a second reduced particulate stream; and supplying the second reduced particulate stream to a hydroprocessor.

In another aspect the invention is an apparatus comprising a coking drum that generates overhead vapors, a coker fractionator that receives the overhead vapors from the coking drum and separates them into an overhead vapor stream, intermediate liquid streams, and a flash zone gas oil stream containing a substantial amount of particulate material of varying diameter, and a hydroprocessor located downstream from said fractionator, the improved apparatus further comprising a first separator located downstream of said fractionator and configured to receive the FZGO stream from the fractionator and remove the particulate material having a diameter greater than about 500 micrometers from the FZGO stream to form a first reduced particulate stream; and a second separator comprising a cyclonic separator located downstream of said first separator and configured to remove particulate material having a diameter greater than about 25 micrometers from the first reduced particulate stream to form a second reduced particulate stream.

In a further aspect of the invention, an apparatus that includes two separators is provided, where at least one of the separators is a cyclonic separator having a manifold of cyclones.

The process and apparatus of the invention can advantageously operate continuously on-line without periodic shut downs for back flushing clogged equipment, resulting in lower maintenance and operating costs. Compared to conventional methods, the process and apparatus of the invention can advantageously be implemented with a low initial capital cost. The process and apparatus of the invention also present an opportunity for improving refinery economics by facilitating further processing of the FZGO stream and permitting the use of hydrotreated FZGO as FCC unit feedstock rather than as delayed coker natural recycle.

DETAILED DESCRIPTION OF THE PREFERRED EMBODIMENTS

Figure 1:
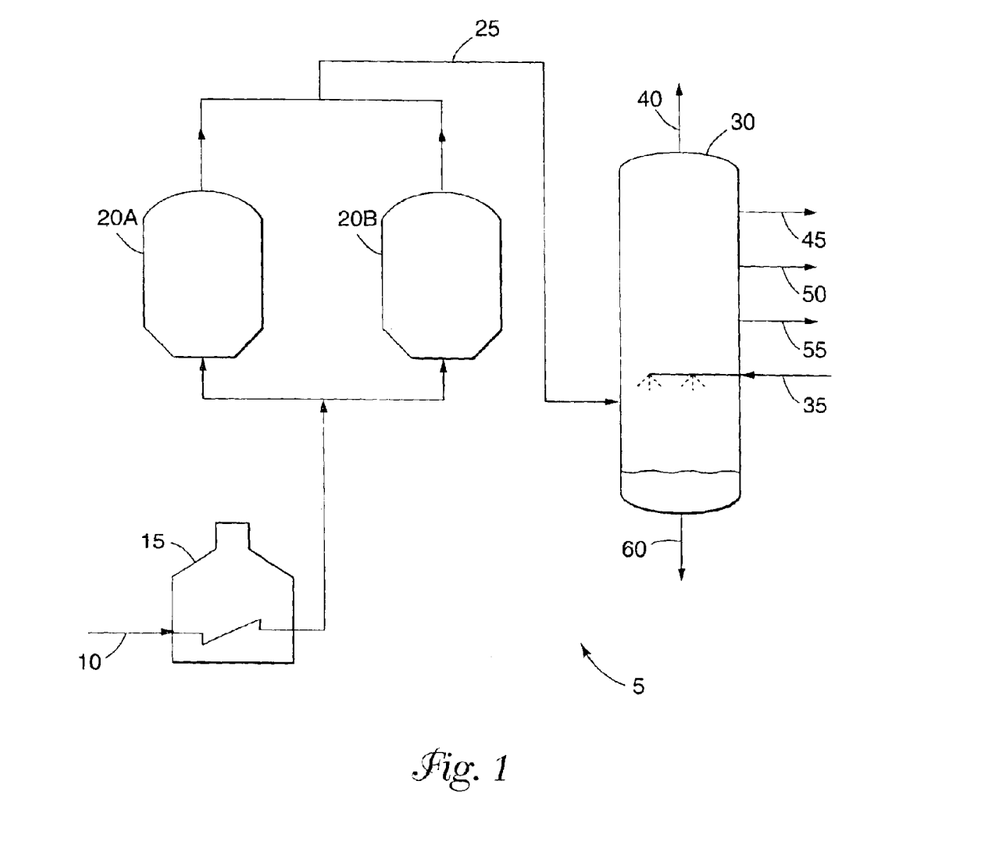
FIG. 1 is a schematic flowsheet depicting a delayed coking process.

FIG. 1 illustrates a basic delayed coking process 5. Coking process 5 can convert feedstock into a gas overhead stream, one or more intermediate liquid streams and a FZGO stream. In operation, a feedstock 10 passes through a furnace 15 and then enters one of two coke drums 20A or 20B. Overhead vapors 25 that exit from the coke drums are quenched and then fed into fractionator 30. A liquid 35, such as a heavy gas oil or a recycle liquid, is sprayed into the flash zone of fractionator 30, where the flash zone is typically located in the lower to middle region of the fractionator. The heavy gas oil 35 can serve two purposes: to knock down suspended particles in the vapors as they enter the fractionator, and/or condense components with higher boiling points from the vapors. A wet gas overhead stream 40 exits from the top of fractionator 30, while one or more intermediate liquid streams 45, 50, 55 exit from the side of fractionator 30. The resulting FZGO stream 60 that may contain suspended coke particles and viscous mesophase material that may coat such particles and make the particles sticky (hereinafter collectively called "particulate material") exits near the bottom of fractionator 30.

In conventional methods, a FZGO stream 60 is generally not fed to a hydrotreater due to rapid catalyst fouling from the suspended particulate material. As a result, the FZGO stream, may be fed unfiltered to an FCC unit. Undesirably, however, the oil stream's high level of aromatic compounds results in poor product yield distribution. Additionally, the FZGO stream often contains undesirable levels of sulfur and could cause the stream exiting the FCC unit to exceed the industry mandated sulfur levels in the gasoline, kerosene and diesel product streams of the refinery. In some instances, an FZGO stream would be used as a lower value stream such as those used to produce high sulfur fuel oil.

Removing particulate material from an FZGO stream advantageously enhances the value of an oil stream by allowing it to be processed further to obtain useful and valuable products. In particular, a reduced particulate oil stream could be fed to a fixed bed catalytic hydrotreater without fear of fouling the catalyst bed. Thus, directing an FZGO stream 60 such as that obtained from a process depicted in FIG. 1 to a separation process would be desirable, as it can be further processed in units such as an FCC unit to produce valuable products.

The present invention provides an improved process and apparatus for separating particulate material suspended in a flash zone oil stream from the oil stream itself, using at least one cyclonic separation unit or separator. In a preferred aspect, the second separator is a cyclonic unit comprising a plurality of cyclones provided in a manifold. This separator is implemented to remove particulate material that have a diameter of greater than about 15 micrometers from an oil stream that is ultimately intended to enter a catalytic cracking unit. A separator located upstream from the cyclonic separator can be implemented to remove larger particulate material that are greater than about 75 micrometer in diameter, to prevent plugging of the cyclonic separator.

Figure 2:
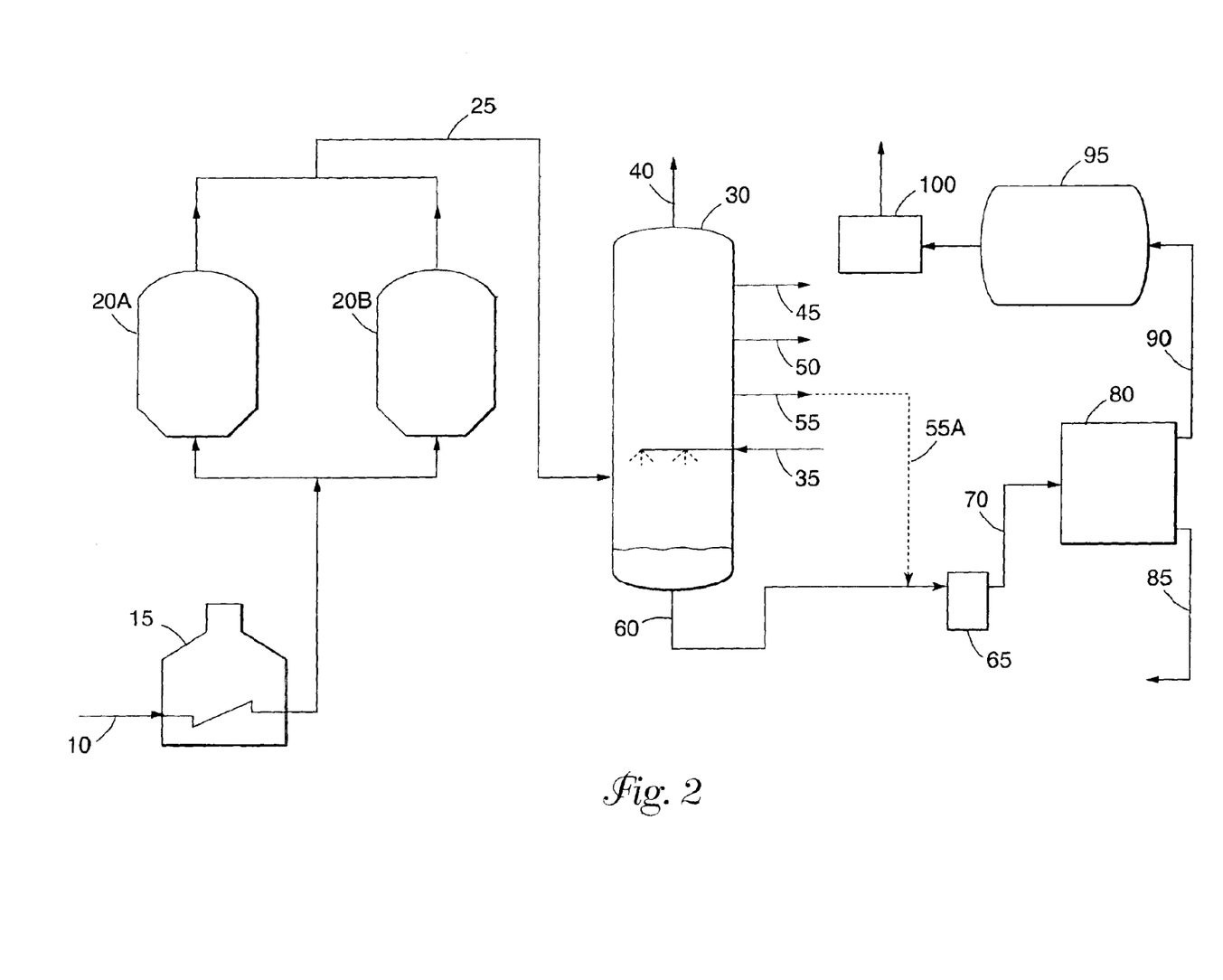
FIG. 2 is a schematic flowsheet depicting an embodiment of the process of the invention.

Referring now to FIG. 2, one embodiment of the present invention is illustrated, that includes a separator 65 implemented in series with a cyclonic separator 80. Separator 65 preferably removes the larger particles from the FZGO stream, such as those having a diameter greater than about 500 micrometers. Cyclonic separator 80 substantially separates and removes the smaller particles, such as those having a diameter greater than about 25 micrometers. If a "cleaner" oil stream is desired, separator 65 can be configured to separate particulate material having a diameter greater than about 100 micrometers; and preferably, particulate having a diameter greater than about 75 micrometers. Similarly, for "cleaner" oil streams, cyclonic separator 80 removes particulate material having a diameter greater than about 15 micrometers.

In preferred operations, separation unit 65 separates at least about 80% of the particulate that has a diameter greater than about 500 micrometers. More preferably, unit 65 separates at least about 90% of the particulate greater than about 500 micrometers. Similar levels of separation efficiency would be desirable for particulate material having a diameter greater than about 100 micrometers, as well as for particulate material having a diameter greater than about 75 micrometers.

Separator 65 can be any device capable of separating, displacing, removing, stripping, filtering, or combinations thereof, the particulate material (e.g. solids and other non-fluids) from a fluid stream. Suitable devices for separator 65, include for example, a strainer, a sieve, a filter, a cyclonic separator, or combinations thereof. In an aspect of the invention, separator 65 is a basket strainer. The strainer can include a wire mesh of about 75 to about 100 micrometers. Other suitable designs include, for example, a duplex or a simplex strainer. In another aspect of the invention, separator 65 comprises a cyclonic separator. This will be described in greater detail in the discussion about FIG. 3 below.

Figure 5:
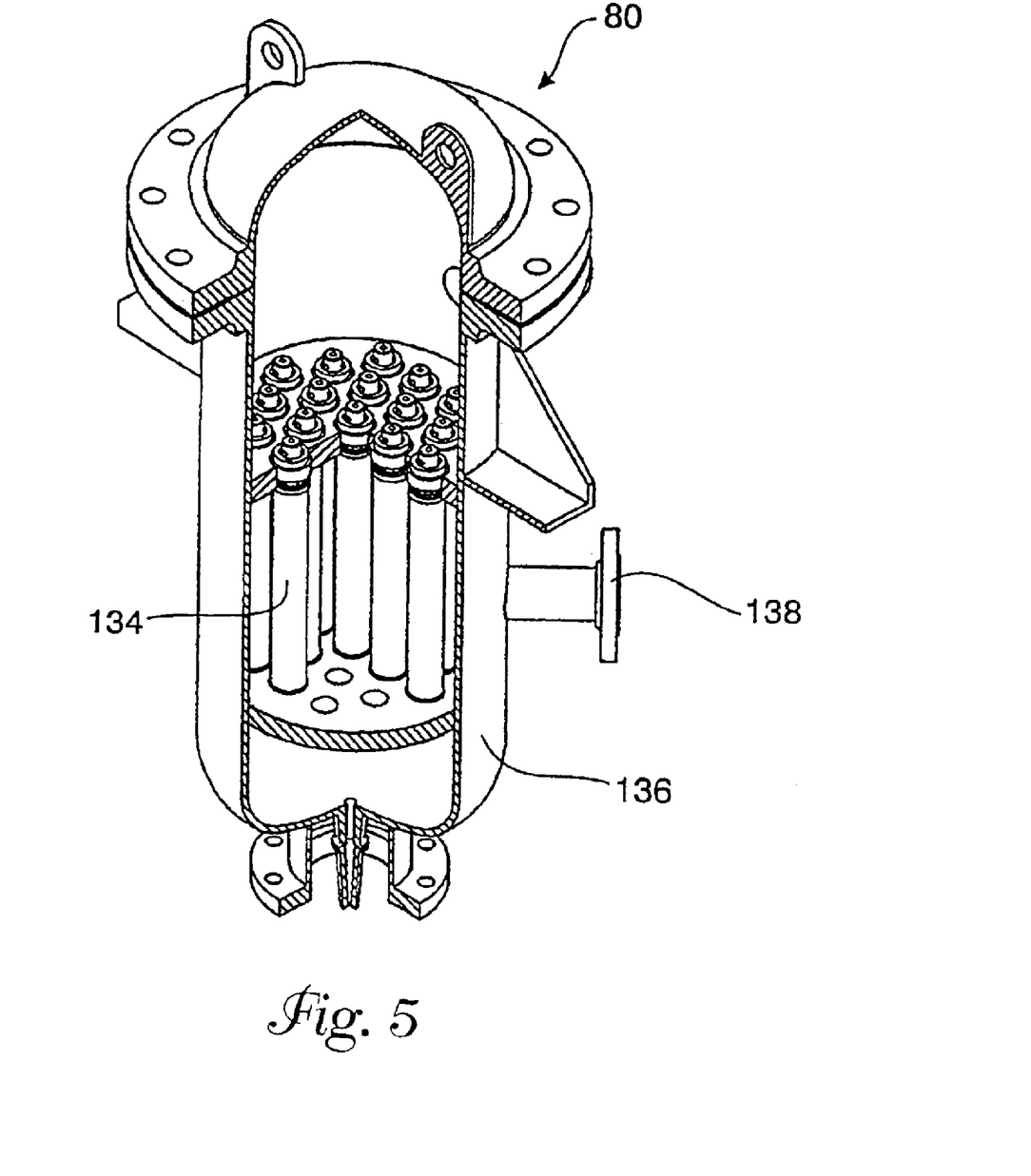
FIG. 5 is a partial cutaway perspective view of a preferred cyclonic separator.

Continuing with the process as depicted in FIG. 2, a reduced particulate oil stream 70 exits separator 65 and is subsequently fed downstream to cyclonic separator 80. In a preferred aspect, cyclonic separator 80 includes a plurality of individual, preferably small-sized, cyclones contained within a manifold, inside a housing or vessel. A preferred separator 80 is illustrated in FIG. 5, the contents of which will be discussed in detail below. In preferred operations, cyclonic separator 80 separates at least about 80% of the particulate having a diameter greater than about 25 micrometers. More preferably, unit 80 is configured to separate at least about 90% of the particulate greater than about 25 micrometers. Similar levels of separation efficiency would be desirable for particulate material having a diameter greater than about 15 micrometers.

Overflow stream 90 from cyclonic separator 80, having a reduced particulate level, can be fed to a hydroprocessing unit 95 where it is processed to be suitable for further processing in a catalytic cracking unit 100, such as a fluidized bed catalytic cracker (FCC). An underflow stream 85 exits the lower region of cyclonic separator 80, carrying away the particulate material displaced from the oil stream 70. Hydroprocessor 95 may be a hydrotreater, a hydrocracking unit, or a hydrodesulfurizer, and typically includes a fixed bed catalyst.

As also shown in FIG. 2, an optional stream of heavy gas oil 55 may be supplied as a feed stream 55A directly to separator 65 to act as a diluent which makes the stream less viscous. This helps prevent plugging of the line, as the stream is carried back to the cyclone 80.

Optionally, a heavy coker gas oil ("HCGO") can be admixed to an underflow stream leaving a separator to avoid plugging the underflow lines. The HCGO can be both a flush oil as well as a distillate recycle to dilute the concentration of coke particles in the stream. Use of an HCGO stream also increases the total liquid volume within the process and helps maintain necessary flow velocities in the process' conduits.

Figure 3:
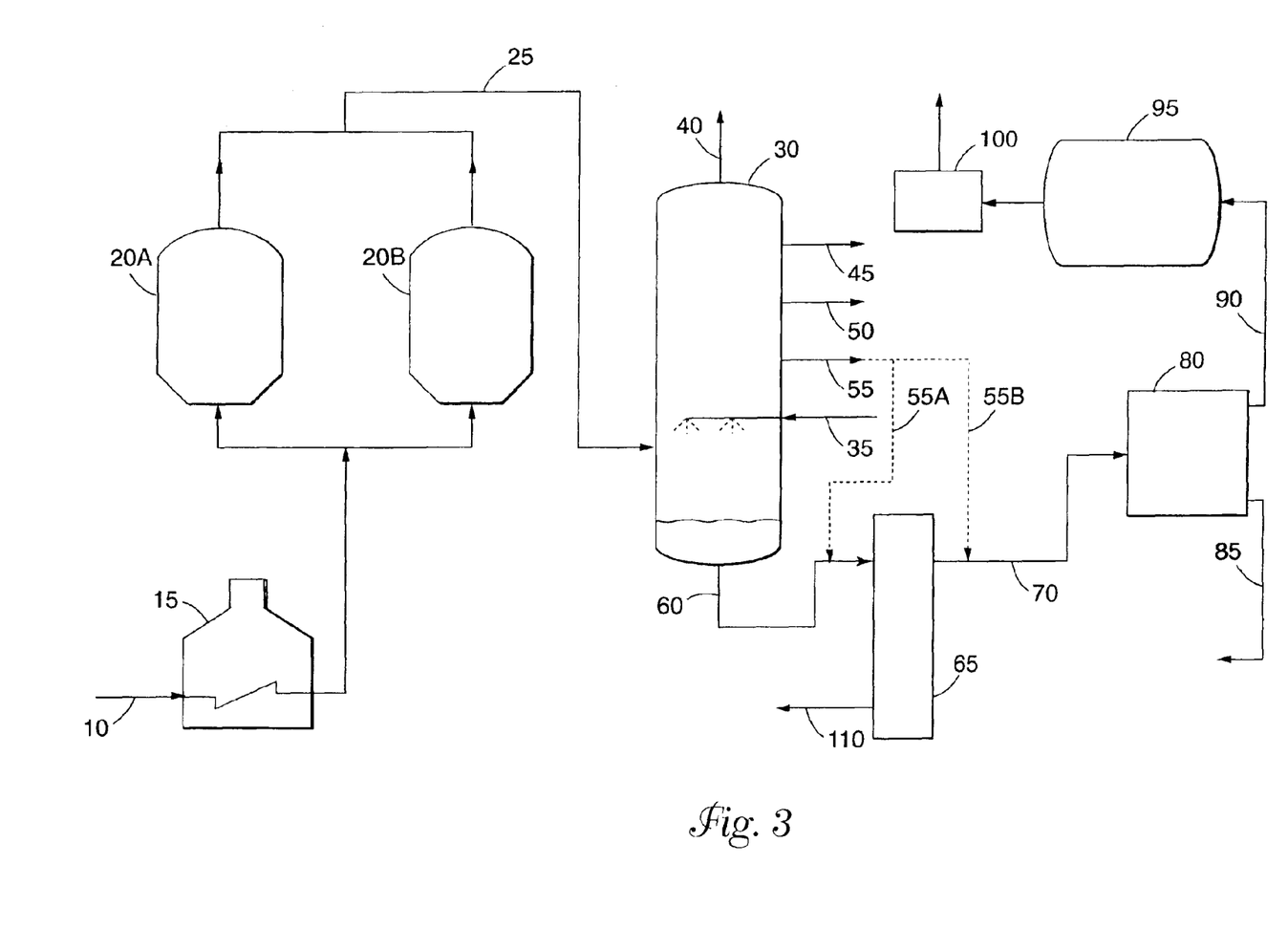
FIG. 3 is a schematic flowsheet depicting another embodiment of the process of the invention.

FIG. 3 provides another embodiment of the present invention wherein separation of particulates from an FZGO stream is accomplished using a series of cyclonic separators. Here, separator 65 is a cyclonic separation unit preferably configured and designed sufficiently large to operate at commercial-coking flow rates, temperatures, and separation efficiencies. As a two-stage cyclonic separation process, unit 65 is operated to substantially remove large particulate material having a diameter greater than about 500 micrometers, while downstream cyclonic separator 80 removes the smaller particles. Preferably separator 65 removes particulate having a diameter greater than about 100 micrometers and more preferably particulate having a diameter greater than about 75 micrometers. Advantageously, by removing most of the larger sized particulates from the FZGO stream, cyclonic separator 80 can be operated efficiently, with the potential or frequency of plugging minimized if not eliminated. Preferably, separator 65 operates at separation efficiencies (percent removal) similar to that described above in FIG. 2. To sustain general commercial coking process parameters, the nominal diameter of a cyclonic separator 65 is preferably between about four and ten inches. This may change, however, depending on the length of the vessel, desired throughput, and/or other process parameters that could affect the separation process.

As shown in FIG. 3, FZGO stream 60 enters separator 65, where it is processed to remove the larger particulates from the FZGO. An overflow stream 70 having a reduced level of particulate material exits separator 65, while an underflow stream 110 exits the lower region of separator 65. Underflow stream 110 contains the centrifugally displaced particulates from FZGO stream 60.

In the practice of the invention, there may be desired velocities, volumes, and volumetric flow rates that maximize a process' efficiency and productivity. In an aspect of the invention, where industrial volumes are processed in commercial-worthy timelines, a separator such as 65 or 80 is operated with a pressure drop sufficient to sustain the volumes and flow rate through the process. Furthermore, it has been found that sufficient pressure drop can ensure efficient, unencumbered operation of a separator. Thus, for example, where separator 65 is a cyclonic vessel as shown in FIG. 3, the unit is preferably operated with a pressure drop of at least 10 psig. More preferably, the unit is operated with a pressure drop of at least 20 psig. In preferred aspects, cyclonic separator 80 is operated with a pressure drop of at least 25 psig; more preferably, the pressure drop is at least 50 psig.

Optionally, heavy gas oil streams 55A and 55B produced by fractionator 30 can be directed to unit 65 and 80, respectively, as shown in FIG. 3. Directing stream 55A to separator 65 may be advantageous where a significant amount of large particles are in the heavy gas oil stream. If there are very few large particles, then stream 55B is preferably directed to separator unit 80 to reduce the pump pressure requirements. Also, an optional stream of distillate flush oil can be mixed with underflow stream 110 to prevent plugging of the underflow lines.

Figure 4:
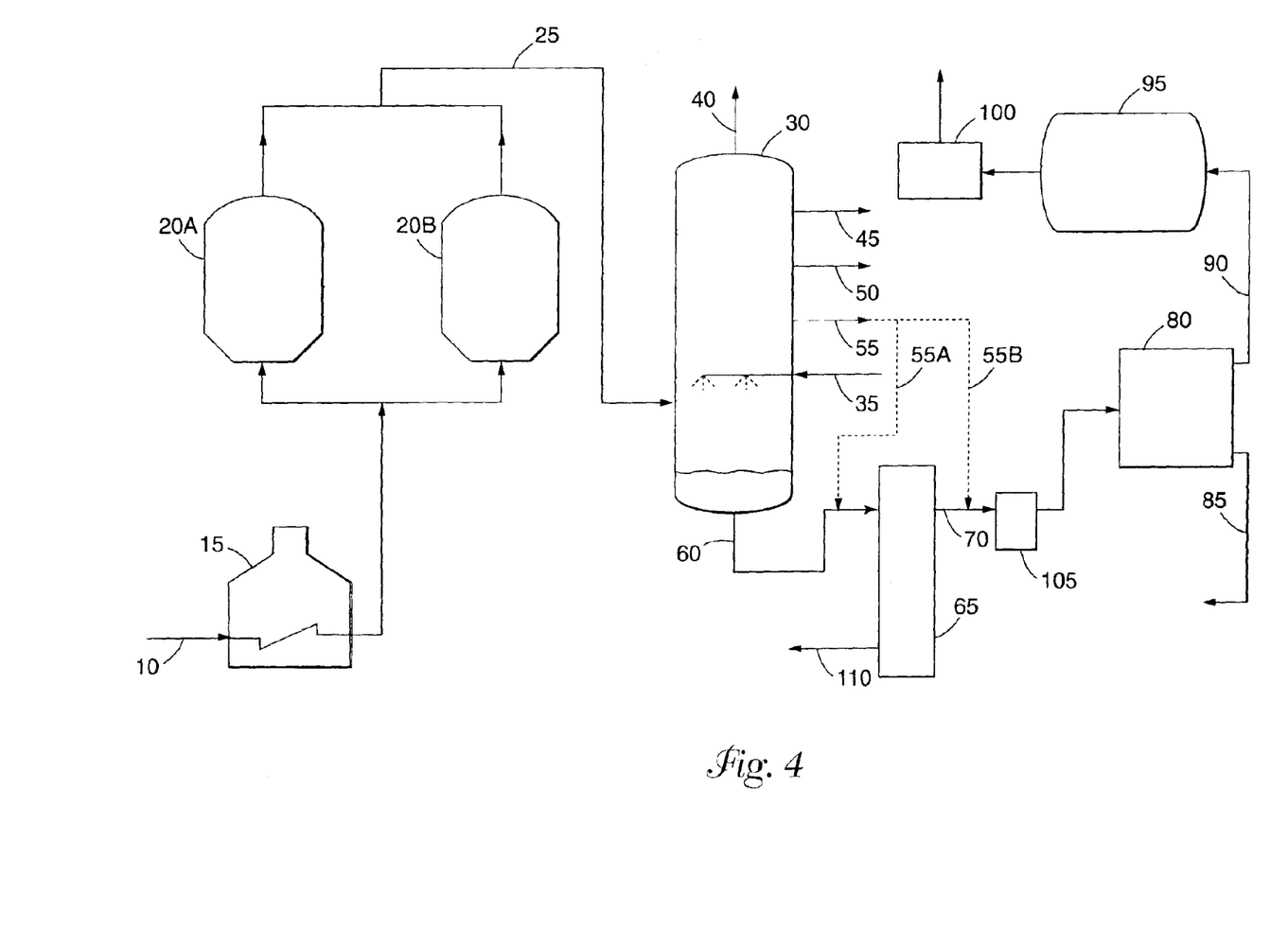
FIG. 4 is a schematic flowsheet depicting a further embodiment of the process of the invention.

A further embodiment of the invention includes at least three separation units as shown in FIG. 4. The third separator 105 is preferably located downstream for separator 65 and upstream from separator 80. Separator 105 can be yet another cyclonic separator, a strainer, a filter, or any other solid removal device. The separation device in unit 105 is preferably deigned to be capable of removing particulate material from an oil stream, and therefore serves to be either a back-up for periods when unit 65 is inoperative or down, or as a second assurance that large particulate are removed from the oil stream prior to entering cyclonic separator 80.

Optionally, the underflow stream 85 originating from cyclonic separator 80 can be combined with the underflow stream 110 from separator 65 to form a combined underflow stream (not shown) that can be returned to coker fractionator 30 as natural recycle. A moderate amount of the combined stream is preferably used. Thus, the volume of the two combined underflow streams, not including any distillate flush oil with which they are mixed, is preferably less than about 5% of the total FZGO stream, but can be as low as about 1.5% of the total FZGO stream.

The flow rate of the various streams within the process can be controlled with a variety of instrumentation and equipment as is known in the art. Thus, additional equipment and apparatuses such as valves, controllers, flowmeters, indicators, etc., can be added to the process, although not depicted in the flowsheets of FIGS. 1–4. Furthermore, the use of a heavy coker gas oil can also be added as a flush oil to alleviate potential plugging in the process.

Cyclonic separators useful for the methods of the invention are those modeled after cyclones, where elongate vessels are designed with inlet ports strategically placed tangential to the vessel body, such that a vortex is produced as fluid flows into the vessel. Using centrifugal force, denser material (e.g. solids or particulate material) are removed and separated from the FZGO stream. Cyclonic separators suitable for the invention can range in size (e.g., nominal diameter) from about 0.5 inch to about 15 inches. The size (e.g. diameter of a single cyclone to remove large particulate, or the number of cyclones in a multi-cyclone unit) can vary, as the size is determined by an intended quantity (volume) of fluid throughput.

For acceptable operation of a cyclonic separator in a delayed coking process of the invention, several factors could determine how a cyclonic separation unit is designed and configured (e.g. size, diameter, length). These factors include, for example, the desired liquid throughput, the size of particles intended to be removed, and process efficiency. Determining the cyclone size is generally the first step; the flow rate through the apparatus can then be determined based on that size. For multiple cyclone units (i.e. a manifold of cyclones), the number of cyclones needed to achieve the desired process efficiency can be determined by dividing the total desired flow rate for the system by the flow rate per cyclone.

The ability of a cyclone to separate particulate material from a liquid is based on various factors. These include, the difference between the specific gravity of the liquid and the specific gravity of the particulate, as well as the centrifugal force within the hydrocyclone. The centrifugal force within the cyclone is determined by both the viscosity of the liquid and the pressure drop across the cyclone. In the present invention, the liquid is typically a FZGO stream, which is a heavy oil fraction. This type of stream can be a gel at ambient temperatures. However, as an FZGO stream leaves a fractionator, its temperature is generally between about 600° F. to about 800° F. (315.6° C. to 426.7° C.) depending on the coke drum cycle. The specific gravity and viscosity of an FZGO stream varies, depending on its temperature. Thus, it is preferred that a cyclonic separator for the process and apparatus of the invention is operated at temperatures of about 600° F. to about 800° F. (315.6° C. to 426.7° C.) to ensure acceptable operation and efficiency.

Referring now to FIG. 5, a cyclonic separator 80 suitable for the invention is illustrated, wherein the unit includes multiple cyclone units 134, each configured to centrifugally remove small particulate material. Individual cyclones 134 are preferably arranged adjacent and parallel to one another inside a vessel body 136 and held in place to provide a manifold of cyclones. By using a plurality of the individual units, the cyclonic separator 80, as a whole, can operate to process commercial or industrial size volumes of fluid.

In preferred embodiments, unit 80 comprises individual cyclones 134 that are about 0.5 to about 4 inches in diameter; more preferably the nominal diameter is between about 0.5 and about 2 inches. Unit 80 is preferably configured to operate at a flow rate of at least about 5.5 gallons per minute (0.35 liters per second) per cyclone. More preferably, cyclonic separator 80 includes cyclones that can process at least about 7.5 gallons per minute (0.47 liters per second). The desired flow rate through a cyclone can help determine the number of individual cyclones used in manifold 135. Thus, in certain embodiments of the invention where flow rates are at least about 5.5 gallons per minute per cyclone, the number of individual cyclones can be between about 7 and 60. The number of individual cyclones, however, can be varied according to an anticipated flow rate through the process and the desired removal efficiency of particulate material. For example, a larger flow rate may require more individual cyclones within the manifold.

In a preferred assembly, about twenty openings or slots in manifold 135 are available for holding individual cyclones within vessel body 136. Depending on how many cyclones are used in the manifold, unused openings can be filled with blanks or capped off.

Figure 6:
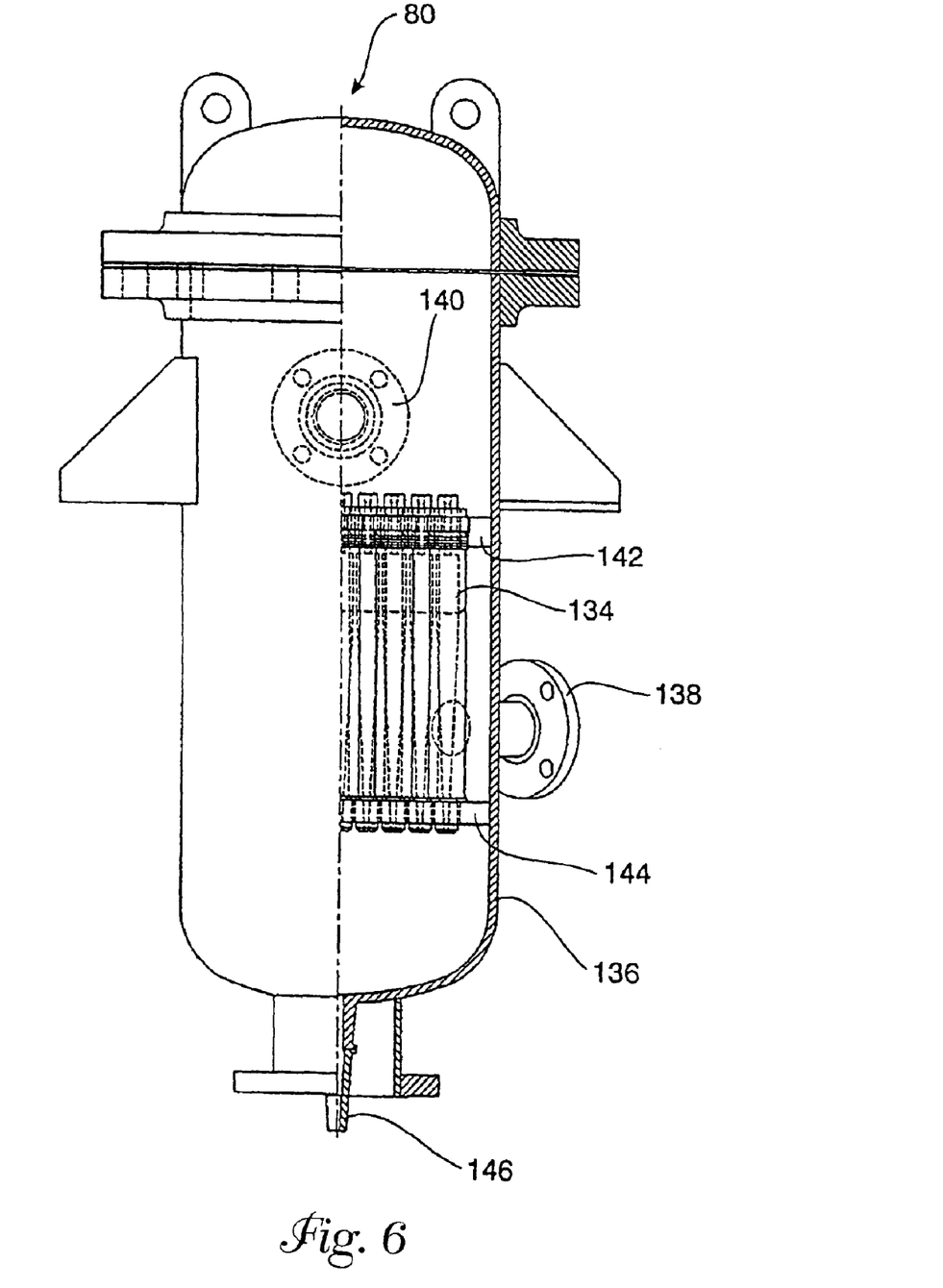
FIG. 6 is a partial cutaway side view of a preferred cyclonic separator suitable for the invention.

Referring to FIG. 6, separator 80 has an inlet port 138 and an overflow outlet 140. As seen in the figure, the length of cyclones 134 can extend from below vessel inlet 138 to a region adjacent to overflow outlet 140. Cyclones 134 can be secured to an upper plate 142 and a lower plate 144. Preferably, each cyclone 134 contacts upper plate 142 and forms a seal, to minimize leakage of the inlet stream entering port 138 (a reduced particulate stream) into the overflow stream exiting port 140.

A seal that holds an individual cyclone to its manifold allows the system to be sufficiently robust to withstand thermal effects (e.g. contraction and expansion) and prevents unwanted entry and/or mixing of a reduced particulate overflow stream with the subsequent reduced particulate stream. However, such seals can be affected by extreme swings in temperature. During operation, a flash zone gas oil stream can be fed to a cyclonic separator at a temperature between about 600° F. (315.6° C.) to about 800° F. (426.7° C.) during operation. However, during shutdown periods, the cyclonic units may be at much lower ambient temperatures of about 50° F. (10° C.) to 60° F. (15.6° C.), or even less, depending on the climate. As is generally known, shutdown and start-up of operations can challenge equipment, particularly at joints, seals, etc. due to the extreme swings in temperature. Thus, the present invention, has overcome these challenges by implementing a seal that can maintain its seal capability and integrity even through multiple cycles between broad temperature ranges, such as from ambient to 800° F. (426.7° C.), and back.

Figure 7:
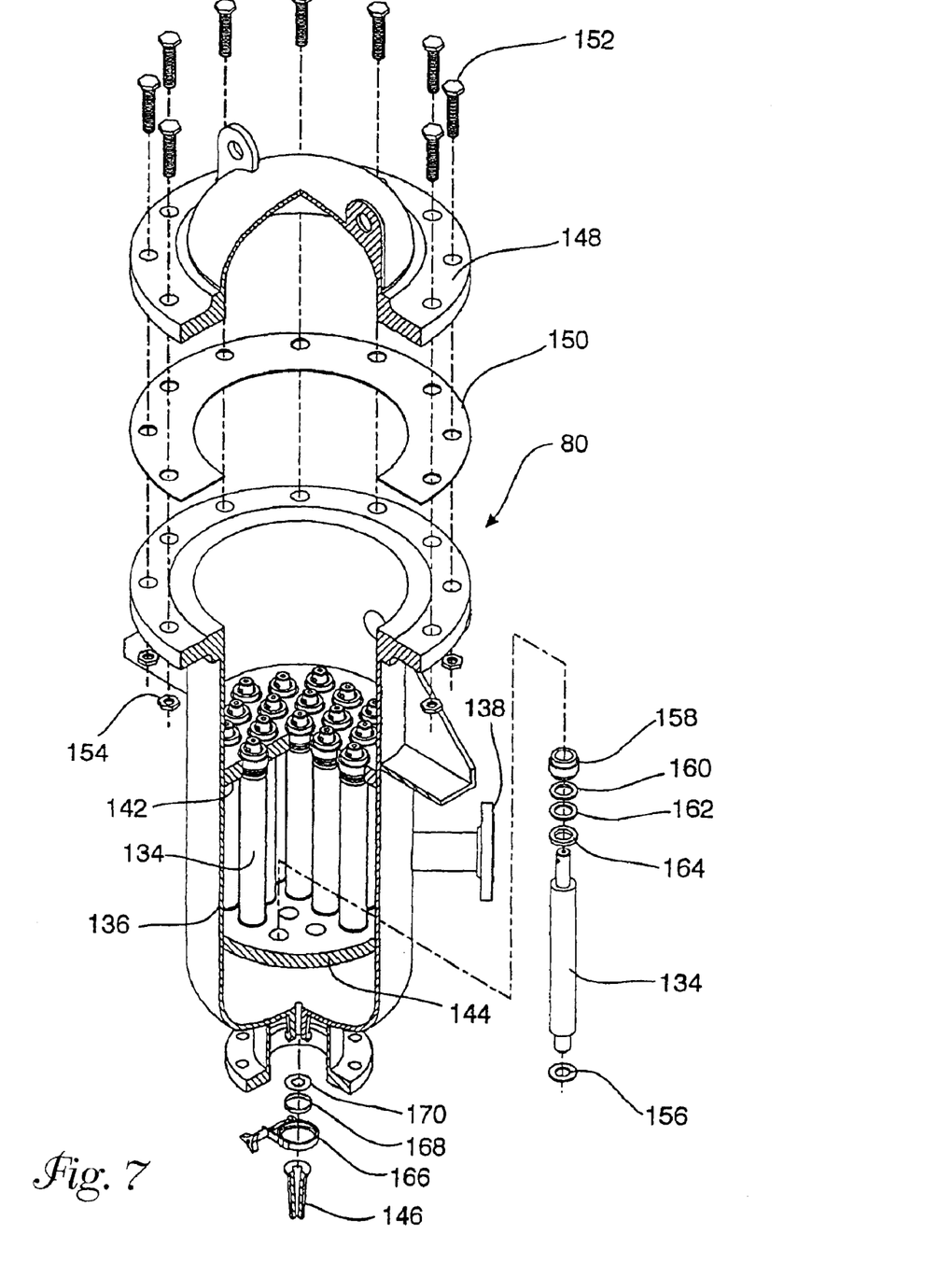
FIG. 7 is an exploded, partial cutaway perspective view of the cyclonic separator of FIG. 6.

It has been found that using a configuration of bushings, washers, and gaskets, advantageously creates a sufficient seal between each of the cyclones and both lower plate 144 and upper plate 142. A preferred seal assembly is illustrated in FIG. 7, wherein inside vessel body 136, each cyclone 134 preferably contacts a lower plate 144 with a gasket 156, and contacts an upper plate 142 by a bushing 158, washer 160, gasket 162 and a spring washer 164. Preferably, the assembly comprises at least two spring washers. A preferred spring washer is a Bellville or disc washer. Suitable materials for gaskets 156 and 162 comprise material that remains flexible at high temperatures (e.g. above 600° F. (315.6° C.). A preferred material is flexible graphite.

Further shown in FIG. 7, cyclones 134 separate a FZGO stream into an overflow stream that can leave through overflow outlet 140 (not shown, but preferably located between the upper plate 142 and the vessel cap 148 as seen in FIG. 6) and an underflow stream (containing the displaced particulate) that can leave through an apex 146 located at the bottom of vessel body 136. Apex 146 can be secured to vessel body 136 with an adjustable clamp 166, a centering ring 168, and a gasket 170. In a preferred assembly, apex 146 is removable. Alternatively, apex 146 can be non-removable and coupled to vessel body 136 using a flange-style connection.

The manifold of cyclones can optionally include elongate rods that connect the top and bottom plates, 142 and 144, respectively, to provide stiffening support to the manifold. The rods minimize potential movement of the vessel plates during thermal changes that occur during operation of the process. Also optionally, an inspection/drain conduit can be provided to allow drainage of the fluid level. This is particularly useful when a unit has to be shutdown for maintenance activities.

Figure 8:
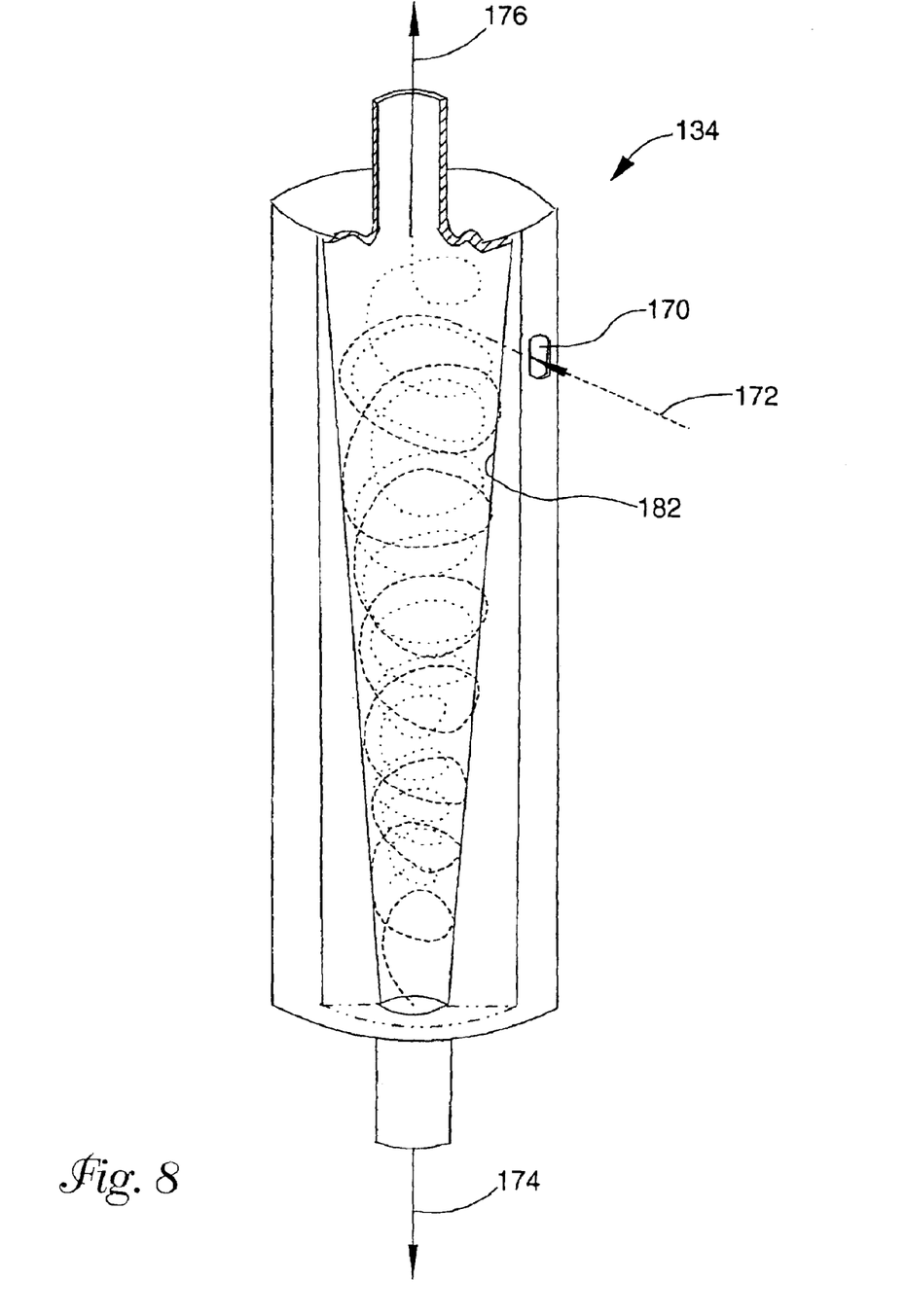
FIG. 8 is a partial cutaway perspective view of an individual cyclone useful in the separator of FIGS. 6 and 7.

FIG. 8 depicts an individual cyclone 134 suitable for configuration into a cyclonic separator 80. This figure is provided merely to illustrate the fluid flow within a cyclone, where a FZGO stream (illustrated by dashed line) 172 is separated into an underflow stream 174 containing displaced particulate material, and a reduced particulate overflow stream 176, the stream having been substantially stripped of particulate material. The FZGO stream enters tangentially into cyclone 134 through an inlet or nozzle 178 and forms a whirlpool or vortex effect. The particulate solid material (not shown) generally having a higher density (i.e. heavier) than the FZGO in which it is suspended, is thrown by centrifugal force away from the center of the vortex. As the particulate solid material approaches the interior surface wall 182 of the cyclone it moves more slowly and falls by force of gravity to the bottom of the cyclone, where it exits cyclone 134 into underflow stream 174. The remainder of the FZGO which has been substantially stripped of particulate material exits the top of the cyclone as an overflow stream 176.

While several particular embodiments of the process and apparatus of the invention have been illustrated and described, it will be apparent that various modifications can be made without departing from the spirit and scope of the invention. Moreover, references to materials of construction, specific dimensions, and utilities or applications are also not intended to be limiting in any manner, and other materials, dimensions and utilities or applications could be substituted and remain within the spirit and scope of the invention. Accordingly, it is intended that the process and apparatus of the invention not be limited, except as by the appended claims, and that such, other embodiments be included within the scope of the following claims.

What is claimed is:

1. In a delayed coking process in which overhead vapors from a coking drum are fed to a coker fractionator where said vapors are separated into an overhead vapor stream, intermediate liquid streams, and a flash zone gas oil stream containing a substantial amount of particulate material of varying diameter, the improvement comprising:

supplying said flash zone gas oil stream to a first separator;

operating said first separator to remove particulate material having a diameter greater than about 500 micrometers from said flash zone gas oil stream and form a first reduced particulate stream;

supplying said first reduced particulate stream to a second separator comprising a cyclonic separator;

operating said second separator to remove particulate material having a diameter greater than about 25 micrometers from said first reduced particulate stream and form a second reduced particulate stream; and supplying said second reduced particulate stream to a hydroprocessor.

2. The process of claim 1 comprising operating said first separator to remove at least about 80% of particulate having a diameter greater than about 500 micrometers from said flash zone gas oil stream.

3. The process of claim 1 comprising operating said first separator to remove at least about 90% of particulate having a diameter greater than about 500 micrometers from said flash zone gas oil stream.

4. The process of claim 1 comprising operating said first separator to remove at least about 80% of particulate having a diameter greater than about 100 micrometers from said flash zone gas oil stream.

5. The process of claim 1 comprising operating said first separator to remove at least about 90% of particulate having a diameter greater than about 100 micrometers from said flash zone gas oil stream.

6. The process of claim 1 comprising operating said first separator to remove at least about 80% of particulate having a diameter greater than about 75 micrometers from said flash zone gas oil stream.

7. The process of claim 1 comprising operating said first separator to remove at least about 90% of particulate having a diameter greater than about 75 micrometers from said flash zone gas oil stream.

8. The process of claim 1 comprising operating said second separator to remove at least about 80% of particulate having a diameter greater than about 25 micrometers from said flash zone gas oil stream.

9. The process of claim 1 comprising operating said second separator to remove at least about 90% of particulate having a diameter greater than about 25 micrometers from said flash zone gas oil stream.

10. The process of claim 1 comprising operating said second separator to remove at least about 80% of particulate having a diameter greater than about 15 micrometers from said flash zone gas oil stream.

11. The process of claim 1 comprising operating said second separator to remove at least about 90% of particulate having a diameter greater than about 15 micrometers from said flash zone gas oil stream.

12. The process of claim 1 comprising operating said second separator at a pressure drop of at least about 25 psig (241.32 kPa).

13. The process of claim 1 comprising operating said second separator at a pressure drop of at least about 50 psig (344.74 kPa).

14. The process of claim 1 wherein said first separator comprises a strainer.

15. The process of claim 14 wherein said strainer has a mesh size of about 75 to about 500 micrometers.

16. The process of claim 14 wherein said strainer comprises a basket strainer.

17. The process of claim 1 wherein said first separator comprises a cyclonic separator.

18. The process of claim 17 comprising operating said first separator at a pressure drop of at least about 10 psig (68.95 kPa).

19. The process of claim 17 comprising operating said first separator at a pressure drop of at least about 20 psig (137.90 kPa).

20. The process of claim 1 comprising supplying said flash zone gas oil stream to said first separator at between about 650° F. (343.3° C.) to about 800° F. (426.7° C.).

21. The process of claim 1 wherein said second separator comprises a plurality of cyclones contacting a manifold through a seal.

22. The process of claim 21 wherein said seal is maintained at temperatures ranging from ambient to about 800° F. (426.7° C.).

23. The process of claim 21 wherein said second separator comprises at least 7 cyclones, each having a diameter between about 0.5 inch to about 4 inches.

24. The process of claim 21 wherein each cyclone of said plurality of cyclones has a diameter between about 1 and about 2 inches.

25. The process of claim 21 wherein each cyclone of said plurality of cyclones has a diameter of about 1 inch.

26. The process of claim 1 further comprising supplying said first reduced particulate stream to a third separator prior to supplying said stream to said second separator.

27. The process of claim 26 wherein said third separator comprises a strainer.

28. The process of claim 27 wherein said strainer has a mesh size of about 75 to about 500 micrometers.

29. The process of claim 26 wherein said third separator comprises a cyclonic separator.

30. The process of claim 29 comprising operating said third separator at a pressure drop of at least about 10 psig (68.95 kPa).

31. The process of claim 29 comprising operating said third separator at a pressure drop of at least about 20 psig (137.90 kPa).

32. The process of claim 1 wherein one of the intermediate liquid streams comprises a heavy coker gas oil, the process further comprising mixing said heavy coker gas oil with said flash zone gas oil stream prior to supplying said flash zone gas oil stream to said first separator.

33. The process of claim 26 wherein one of the intermediate liquid streams comprises a heavy coker gas oil, the process further comprising mixing said heavy coker gas oil with said first reduced particulate stream prior to supplying said first reduced particulate stream to said third separator.

* * * * *

UNITED STATES PATENT AND TRADEMARK OFFICE
CERTIFICATE OF CORRECTION

PATENT NO.    : 6,919,017 B2
DATED         : July 19, 2005
INVENTOR(S)   : Sharon A. Annesley, Gary C. Hughes and Jamal Allyen Sandarusi

It is certified that error appears in the above-identified patent and that said Letters Patent is hereby corrected as shown below:

<u>Column 9,</u>
Line 62, delete "241.32 kPa" and replace it with -- 273.69kPa --.

<u>Column 10,</u>
Line 3, delete "344.74 kPa" and replace it with -- 446.06kPa --.
Line 14, delete "68.95 kPa" and replace it with -- 170.27kPa --.
Line 47, delete "241.32 kPa" and replace it with -- 170.27kPa --.
Lines 50 and 62, delete "137.90 kPa" and replace it with -- 239.22kPa --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,919,017 B2  Page 1 of 1
APPLICATION NO. : 10/121897
DATED : July 19, 2005
INVENTOR(S) : Sharon A. Annesley, Gary C. Hughes and Jamal Allyen Sandarusi It is certified that error appears in the above-identified patent and that said Letters Patent is hereby corrected as shown below:

Column 9,
Line 61, delete "241.32 kPa" and replace it with -- 173.37 kPa --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

PATENT NO.         : 6,919,017 B2  Page 1 of 1
APPLICATION NO. : 10/121897
DATED              : July 19, 2005
INVENTOR(S)        : Sharon A. Annesley, Gary C. Hughes and Jamal Allyen Sandarusi It is certified that error appears in the above-identified patent and that said Letters Patent is hereby corrected as shown below:

<u>Column 9</u>
Line 62, delete "241.32 kPa" and replace it with -- 172.37 kPa --.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,919,017 B2 Page 1 of 1
APPLICATION NO. : 10/121897
DATED : July 19, 2005
INVENTOR(S) : Sharon A. Annesley, Gary C. Hughes and Jamal Allyen Sandarusi It is certified that error appears in the above-identified patent and that said Letters Patent is hereby corrected as shown below:

In the Claims:

Column 10,

Line 3, delete "446.06 kPa" and replace it with -- 344.74 kPa --.

Line 14, delete "170.27 kPa" and replace it with -- 68.95 kPa --.

Line 47, delete "170.27 kPa" and replace it with -- 68.95 kPa --.

Line 50, delete "239.22 kPa" and replace it with -- 137.90 kPa --.

Signed and Sealed this
Twenty-seventh Day of August, 2013

Teresa Stanek Rea
*Acting Director of the United States Patent and Trademark Office*